United States Patent
Wolter et al.

(10) Patent No.: US 12,249,683 B2
(45) Date of Patent: Mar. 11, 2025

(54) RECHARGEABLE LITHIUM ION BATTERY FOR WIDE TEMPERATURE RANGE AND HIGH TEMPERATURES

(71) Applicant: CUSTOMCELLS HOLDING GMBH, Itzehoe (DE)

(72) Inventors: Christopher Wolter, Hamburg (DE); Sebastian Kraas, Wolfenbuettel (DE); Stefan Permien, Neumuenster (DE)

(73) Assignee: CUSTOMCELLS HOLDING GMBH, Itzehoe (DE)

( * ) Notice: Subject to any disclaimer, the term of this patent is extended or adjusted under 35 U.S.C. 154(b) by 695 days.

(21) Appl. No.: 17/600,111

(22) PCT Filed: Apr. 1, 2019

(86) PCT No.: PCT/EP2019/000102
§ 371 (c)(1),
(2) Date: Sep. 30, 2021

(87) PCT Pub. No.: WO2020/200392
PCT Pub. Date: Oct. 8, 2020

(65) Prior Publication Data
US 2022/0200040 A1    Jun. 23, 2022

(51) Int. Cl.
*H01M 10/0525* (2010.01)
*H01M 4/52* (2010.01)
(Continued)

(52) U.S. Cl.
CPC ....... *H01M 10/0525* (2013.01); *H01M 4/521* (2013.01); *H01M 4/622* (2013.01);
(Continued)

(58) Field of Classification Search
CPC .. H01M 10/0525; H01M 4/521; H01M 4/622; H01M 4/662; H01M 10/44;
(Continued)

(56) References Cited

U.S. PATENT DOCUMENTS 5,240,790 A * 8/1993 Chua ............... H01M 10/0565
429/224
6,210,835 B1    4/2001 Arai
(Continued)

FOREIGN PATENT DOCUMENTS

CN     105826596 A    8/2016
JP     2006-252914 A    9/2006
(Continued)

OTHER PUBLICATIONS

J.-H. Shin et al.: "Rechargeable Li/LiFePO$_4$ cells using N-methyl-N-butyl pyrrolidinium bis(trifluoromethane sulfonyl)imide-LiTFSI electrolyte incorporating polymer additives", Electrochimica Acta, vol. 54, pp. 410-414 (2008).
(Continued)

*Primary Examiner* — Abdullah A Riyami
*Assistant Examiner* — Nader J Alhawamdeh
(74) *Attorney, Agent, or Firm* — Norman B. Thot (57) ABSTRACT

A rechargeable lithium-ion battery includes a housing and a battery cell arranged in the housing. The battery cell includes a liquid electrolyte, a composite anode, a composite cathode, and a separator arranged between the composite anode and the composite cathode. The liquid electrolyte includes an ionic liquid, an organic compound, and a lithium salt. The composite anode includes a metal current collector coated with a layer which includes an active material and a binder. The composite cathode includes a metal current collector coated with a layer which includes an active material and a binder. The active material of the composite anode is a lithium titan oxide (LTO). The composite cathode, the composite anode, and the separator, when immersed in the liquid electrolyte, are heat resistant at temperatures of above 150° C. The rechargeable lithium-ion battery is
(Continued)

rechargeable in a temperature range of from −30° C. to 150° C.

13 Claims, 6 Drawing Sheets

(51) Int. Cl.
| | |
|---|---|
| *H01M 4/62* | (2006.01) |
| *H01M 4/66* | (2006.01) |
| *H01M 10/44* | (2006.01) |
| *H01M 50/414* | (2021.01) |
| *H01M 50/423* | (2021.01) |
| *H01M 50/429* | (2021.01) |
| *H01M 50/491* | (2021.01) |

(52) U.S. Cl.
CPC ........... *H01M 4/662* (2013.01); *H01M 10/44* (2013.01); *H01M 50/414* (2021.01); *H01M 50/423* (2021.01); *H01M 50/429* (2021.01); *H01M 50/491* (2021.01); *H01M 2300/0014* (2013.01)

(58) Field of Classification Search
CPC .............. H01M 50/414; H01M 50/423; H01M 50/429; H01M 50/491; H01M 2300/0014; H01M 10/0569; H01M 50/4295; H01M 50/44; H01M 10/0565; H01M 10/0568; H01M 2300/0045; H01M 4/136; H01M 4/485; H01M 4/505; H01M 4/525; H01M 4/5825; H01M 10/0567; H01M 4/131; Y02E 60/10
See application file for complete search history.

(56) References Cited

U.S. PATENT DOCUMENTS

| | | | | |
|---|---|---|---|---|
| 11,158,856 | B2* | 10/2021 | Mane ................. | H01M 4/0428 |
| 2005/0100786 | A1 | 5/2005 | Ryu et al. | |
| 2006/0147808 | A1 | 7/2006 | Xiao et al. | |
| 2009/0305145 | A1 | 12/2009 | Kim et al. | |
| 2013/0236764 | A1 | 9/2013 | Hu et al. | |
| 2015/0111086 | A1* | 4/2015 | Arnold ................ | H01M 50/489 |
| | | | | 29/623.5 |
| 2015/0180023 | A1* | 6/2015 | Xiao ................... | H01M 4/0423 |
| | | | | 429/231.8 |
| 2015/0380767 | A1 | 12/2015 | Darolles et al. | |
| 2017/0047586 | A1* | 2/2017 | Kulisch ............. | H01M 10/052 |
| 2017/0077557 | A1* | 3/2017 | Zheng ............... | H01M 10/0525 |
| 2017/0170441 | A1* | 6/2017 | Arnold ................. | H01M 50/46 |
| 2017/0170515 | A1* | 6/2017 | Yushin ................. | H01M 4/582 |
| 2018/0248221 | A1 | 8/2018 | Wang et al. | |
| 2019/0157679 | A1 | 5/2019 | Daigle et al. | |
| 2019/0305296 | A1* | 10/2019 | Liao ..................... | H01M 4/136 |
| 2022/0200040 | A1* | 6/2022 | Wolter ................. | H01M 4/485 |

FOREIGN PATENT DOCUMENTS

| | | |
|---|---|---|
| JP | 2015-64998 A | 4/2015 |
| WO | WO 2013/134566 A3 | 9/2013 |
| WO | WO 2018/000101 A1 | 1/2018 |

OTHER PUBLICATIONS

D. Hensley et al.: "The Evolution of Oilfield Batteries", Oilfield Review, pp. 42-57 (1998).
R. A. Guidotti et al.: "Overview of High-Temperature Batteries for Geothermal and Oil/Gas Borehole Power Sources", Journal of Power Sources, pp. 1-13 (2004).
M. Winter et al.: "What are Batteries, Fuel Cells, and Supercapacitors?", Chemical Reviews, vol. 104, No. 10, pp. 4245-4269 (2004).
Power Point Presentation "Powering the World With Cutting Edge Technology", Customcells Tailormade Energystorage Solutions, pp. 1-11 (2018).
J.-C. Lassègues et al.: "Lithium solvation in bis(trifluoromethanesulfonyl)imide-based ionic liquids", Physical Chemistry Chemical Physics, vol. 8, pp. 5629-5632 (2006).
J. H. Shin et al.: "Characterization of N-Methyl-N-Butylpyrrolidinium Bis(trifluoromethanesulfonyl)imide-LiTFSI-Tetra(ethylene glycol) Dimethyl Ether Mixtures as a Li Metal Cell Electrolyte", Journal of The Electrochemical Society, vol. 155, pp. A368-A373 (2008).
Data Sheet "TY-1200AAH" TYVA lithium, p. 1.
Data Sheet „TY-2400AAH, TYVA lithium, p. 1.
Saft Data Sheet „Rechargeable high temperature lithium-ion battery, VL 32600-125, pp. 1-2 (2010).
Saft Data Sheet "Rechargeable high temperature lithium-ion battery, VL 25500-125", pp. 1-2 (2009).
Saft Data Sheet "Primary high temperature lithium battery, LSH 20-150", pp. 1-2 (2009).

* cited by examiner

RECHARGEABLE LITHIUM ION BATTERY FOR WIDE TEMPERATURE RANGE AND HIGH TEMPERATURES

CROSS REFERENCE TO PRIOR APPLICATIONS

This application is a U.S. National Phase application under 35 U.S.C. § 371 of International Application No. PCT/EP2019/000102, filed on Apr. 1, 2019. The International Application was published in English on Oct. 8, 2020 as WO 2020/200392 A1 under PCT Article 21(2).

FIELD

The present invention relates to rechargeable lithium-ion batteries. The present invention in particular relates to a rechargeable lithium-ion battery that can be safely operated, charged and discharged with high capacity over a wide temperature range and at high temperatures.

BACKGROUND

Rechargeable lithium-ion batteries are currently widely used as power sources in electronic and electric devices, such as consumer electronics and electrically powered vehicles. Most of these devices, like consumer electronics, are used and charged at temperatures that do not exceed 50° C. Others, for example, electrically powered vehicles, are used and charged in environments where the temperature can vary between 50° C. and −20° C. Some battery powered electronic or electric devices are, however, exposed to higher temperatures, e.g., electronic devices for measuring downhole parameters, such as inclination or deviation, in the field of oil or gas drilling. The operating temperatures of the batteries of such devices are often in the range of 130 to 150° C. depending on conditions such as drilling depth. In order to avoid the consequences of a battery failure, e.g., the need to withdraw the whole drill string from the well or borehole or, even worse, of a downhole battery explosion, the battery must safely operate at temperatures of up to 150° C. In order to avoid the need to withdraw the drill string from the well or borehole when a non-rechargeable battery is empty, it would be highly advantageous to not only be able to operate the battery at temperatures of up to 150° C., but to also recharge the battery at those temperatures. A considerable number of oil or gas drilling operations are currently also located in arctic regions where environmental temperatures can fall well below −20° C. It would therefore also be advantageous to have a rechargeable battery that can be operate at temperatures of −20° C. or less before it is mounted in an electric or electronic device for downhole use.

SUMMARY

An aspect of the present invention is to provide a rechargeable lithium-ion battery that is safe over a wide temperature range and especially at high temperatures, i.e., temperatures of more than 130° C.

An aspect of the present invention is to provide a rechargeable lithium-ion battery that can be recharged with high capacity over a wide temperature range and especially at high temperatures, i.e., at temperatures of more than 130° C.

An aspect of the present invention is to provide a rechargeable lithium-ion battery where the operation of the battery can take place over a wide temperature range and especially at low temperatures, i.e., at temperatures of less than −25° C.

An aspect of the present invention is to provide a rechargeable lithium-ion battery where the composite anode and the composite cathode each can be made in a conventional manner by coating a thin metal current collector with an active material, where the coated metal current collector of the anode, a separator layer, and the coated metal current collector of cathode can be superimposed to each other to produce a layered anode, separator, and cathode assembly, and where the layered anode, separator, and cathode assembly then can be immersed in a liquid electrolyte.

In an embodiment, the present invention provides a rechargeable lithium-ion battery which includes a housing and at least one battery cell which is arranged within the housing. The at least one battery cell comprises a liquid electrolyte, a composite anode, a composite cathode, and a separator which is arranged between the composite anode and the composite cathode. The liquid electrolyte comprises an ionic liquid, at least one organic compound, and a lithium salt. The composite anode comprises a metal current collector which is coated with a layer which comprises at least one active material and at least one binder. The composite cathode comprises a metal current collector which is coated with a layer which comprises at least one active material and at least one binder. The at least one active material of the composite anode is a lithium titan oxide (LTO). The composite cathode, the composite anode, and the separator, when immersed in the liquid electrolyte, are heat resistant at temperatures of above 150° C. The rechargeable lithium-ion battery is rechargeable in a temperature range of from −30° C. to 150° C.

BRIEF DESCRIPTION OF THE DRAWINGS

The present invention is described in greater detail below on the basis of embodiments and of the drawings in which.

DETAILED DESCRIPTION

The present invention proposes a rechargeable lithium-ion battery having a housing and, within the housing, at least one battery cell, wherein the at least one battery cell comprises a liquid electrolyte, a composite anode having a metal current collector coated with a layer of at least one active material and at least one binder, a composite cathode having a metal current collector coated with a layer of at least one active material and at least one binder, and a separator arranged between the composite anode and the composite cathode, wherein the liquid electrolyte comprises an ionic liquid, at least one organic compound and a lithium salt, wherein the active material of the anode is a lithium titan oxide (LTO), wherein the cathode, the anode and the separator, when immersed in the liquid electrolyte, are heat resistant up to temperatures of at least 150° C., and wherein the battery is dischargeable and rechargeable in a temperature range from −30° C. to 150° C.

In a large number of tests with different liquid electrolytes, different active materials of the anode, and different active materials of the cathode, a combination of a liquid electrolyte comprising an ionic liquid, at least one organic compound, and a lithium salt, and an anode having a lithium titan oxide (LTO) as the active material, have proven to be the most heat resistant and to provide for discharging and recharging capabilities with high capacity in a wide operating temperature range and at high operating temperatures. Rechargeable lithium-ion batteries according to the present invention provide a safe operation in a wide operating temperature range from −30° C. to 150° C. It was further possible to expose those batteries to a multitude of cycles of charging and discharging at temperatures of 150° C. without any significant deterioration of the battery. The charging of the batteries could be performed at temperatures as low as −30° C.

Lithium-ion battery cells where the active material of the anode consists of lithium titan oxide (LTO) are characterized by a cell voltage that is somewhat lower than the cell voltage of conventional lithium-ion battery cells having a graphite anode, and therefore have a smaller energy density. Those cells have a very long lifetime of more than 10,000 cycles if they are handled with care. Lithium-ion battery cells of this type are also suited for high charge and discharge rates, however, they have to date not been suggested for use at high temperatures.

Another advantage of the present invention is that by changing the proportion of the ionic liquid and the at least one organic compound in the liquid electrolyte, it is not only possible to adapt the performance of the battery to requirements, i.e., to a slow recharge at low currents and low temperatures or to a fast recharge at high currents and higher temperatures, but also to adapt the upper and lower limits of the operating temperature range to requirements, i.e., to higher or lower environmental temperatures.

A further advantage of the present invention is that the battery can be produced in a conventional manner. In order to provide the composite anode and the composite cathode, respectively, a current collector in the form of a thin metal layer is partly coated with a slurry comprising the at least one active material, the at least one binder, and a solvent. After drying the slurry, the current collector with the dried slurry can be collected on a roll. Before the assembly of the composite anode and the composite cathode, the separator is interposed between adjacent electrodes. Then either a roll of long sheets consisting of a separator/anode/separator/cathode-units is formed, or a prismatic stack consisting of a repetition of separator/anode/separator/cathode/separator-units is assembled. A portion of the metal current collector foils is in both cases not coated. The uncoated areas of all the anodes will be connected to a first collector tab and the uncoated areas of all the cathodes will be connected to a second collector tab. The collector tabs will be connected within the battery casing to inner portions of two battery terminals.

The resulting layered assembly is then inserted into the housing, and liquid electrolyte is filled into the cell.

In an embodiment of the present invention, the current collectors that are coated with the active materials of the anode and of the cathode, respectively, can, for example, advantageously each have a specific resistance of less than 0.04 μΩ·m in order to minimize both internal losses and heat generation within the battery cell. The current collectors can, for example, be made of aluminum or of an aluminum alloy. A conventional production of the battery is thereby further facilitated, and production costs are reduced.

The active material of the cathode is advantageously selected from the group consisting of $LiFePO_4$ (LFP), $LiCoO_2$, LiMnO, LiMnNiO and $Li(Ni_xMn_yCo_x)O_2$(NMC). The active material of the cathode can, for example, be LFP because a combination of a LFP cathode, a LTO anode, and a liquid electrolyte comprising an ionic liquid, at least one organic compound, and a lithium salt have shown the best results in view of temperature resistance and operation over a wide temperature range and at high temperatures, and even at temperatures below 0° C.

The separator can, for example, comprise at least one layer of a nonwoven fibrous separator material where the fibrous separator material is selected from the group consisting of a cellulose, a polyamide, a polyacrylic acid, a polyaramide, a polyimide and/or a polyester, in particular polyethylene terephthalate. The high melting points of these separator materials contribute to a high temperature resistance of lithium-ion battery cells provided with separators made of those materials. The separator can be made from only one of those fibrous separator materials, however, the separator can also be made from a combination of two or more different fibrous separator materials. A separator that comprises three different nonwoven fibrous separator materials consisting of a cellulose, a polyamide, and a polyethylene terephthalate can, for example, be used.

According to the present invention, the composite anode and the composite cathode each comprise at least one binder. The binder provides an optimum dispersion of the active materials, provides for the mechanical stability both during the production of the battery and during its use, and enhances adhesion to the current collector. The binder can, for example, be a styrene butadiene rubber (SBR). Besides being temperature resistant, styrene butadiene rubbers are obtainable in a broad range of molecular weights, with high purity, and a tailor-made degree of substitution. These binders also have a very good water solubility in a large temperature range, pH stability, and compatibility with other formulation constituents. The composite anode and the composite cathode can, for example, further comprise carboxymethylcellulose (CMC) that also acts as a binder and further increases shear resistance during the preparation of the slurry. CMC is also obtainable in a broad range of molecular weights with high purity and a tailor-made degree of substitution.

In an embodiment of the present invention, the organic compound in the liquid electrolyte can, for example, be selected from the group consisting of a low molecular weight polymer, an organic carbonate or gamma-butyrolactone, gamma-valerolactone or delta-valerolactone. The liquid electrolyte can, for example, comprise a low molecular weight polymer which has an alkylene oxide chain, for example, an ethylene oxide chain or a propylene oxide chain, or alternatively comprises a low molecular weight polybutylene glycol dimethyl ether, for example, a diethylene glycol dimethyl ether, a triethylene glycol dimethyl ether or a tetraethylene glycol dimethyl ether.

A further advantageous embodiment of the present invention provides that the thermally stable ionic liquid can, for example, comprise an organic cation and an organic anion. The organic cation can, for example, comprise an imidazolium, piperidinium, pyridinium, pyrrolidinium or ammonium ion. The organic cation in particular comprises 1-ethyl-3-methyl-imidazolium, propyl-methyl-imidazolium, propyl-methyl-imidazolium, 1-butyl-2,3-dimethylimidazolium, 1-hexyl-3-methyl-imidazolium, 1-butyl-3-methylimidazolium, 1-dodecyl-3-methylimidazolium, 1-methyl-1-propylpiperidinium, n-hexylpyridinium, trimethyl-butyl-ammonium, triethyl-butyl-ammonium, 1-butyl-1-methylpyrrolidinium or trihexyl(tetradecyl)phosphonium. The organic anion can, for example, comprise bis(trifluoromethanesulfonyl)imide (TFSI), bis(fluorosulfonyl)imide (FSI), trifluoromethylsulfonate (Tf), 4,5-dicyano-2-(trifluoromethyl)imidazol-1-ide, bis(pentafluoroethanesulfonyl)imide, tetrafluoroborate or tris(pentafluoroethyl)trifluorophosphate.

The lithium salt can be either $LiN(CF_3SO_2)_2$(LiTFSI), $LiN(SO_2F)_2$ (LiFSI), $LiC_6F_3N_4$ (LiTDI), $LiN(CF_3CF_2SO_2)_2$ (LiBETI=BETA), $LiCF_3SO_3$ (LiTf), $LiClO_4$, $LiBF_4$, $LiNO_3$, $LiAsF_6$ or LiI.

When immersed in a liquid electrolyte having one of the aforementioned compositions, a composite cathode, a composite anode and a separator having the aforementioned compositions are heat resistant at temperatures of 150° C. and provide the battery with dischargeability and rechargeabilty in a temperature range from at least −30° C. to 150° C.

First Embodiment

Figure 1:
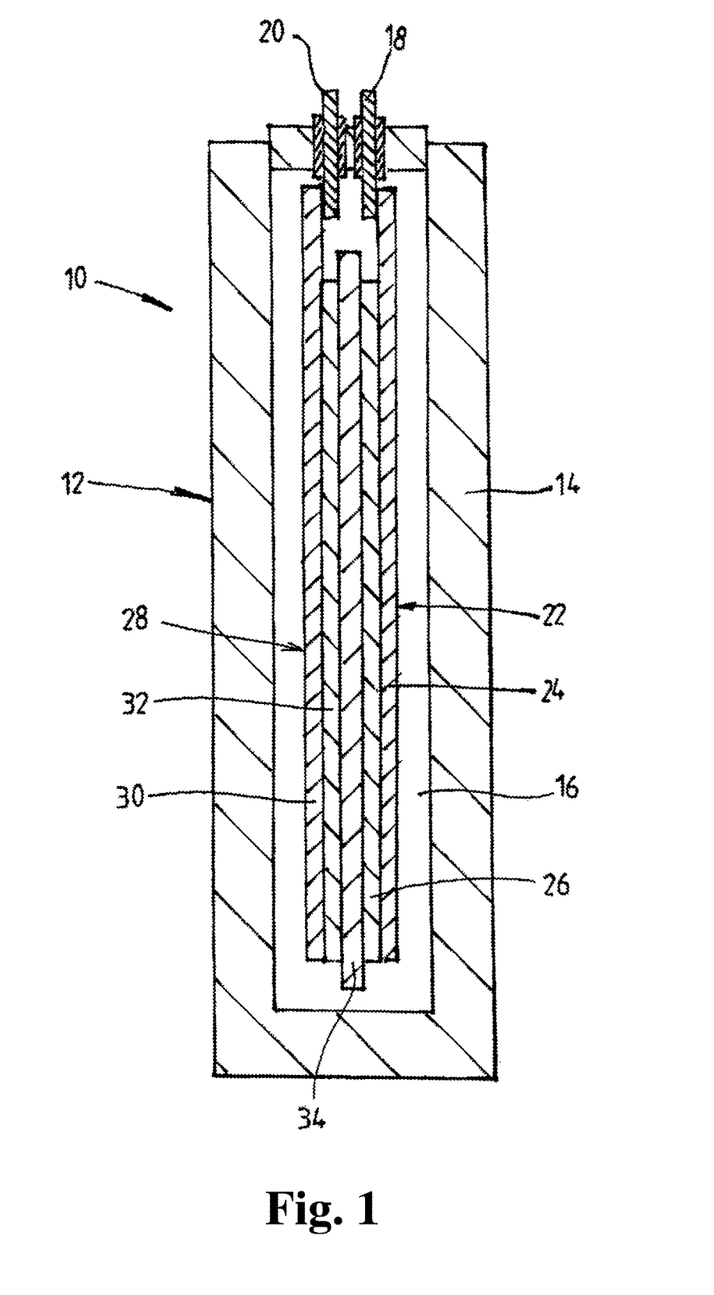
FIG. 1 is a schematic cross-sectional view of a lithium-ion battery according to a first embodiment of the present invention.
Figure 2A:
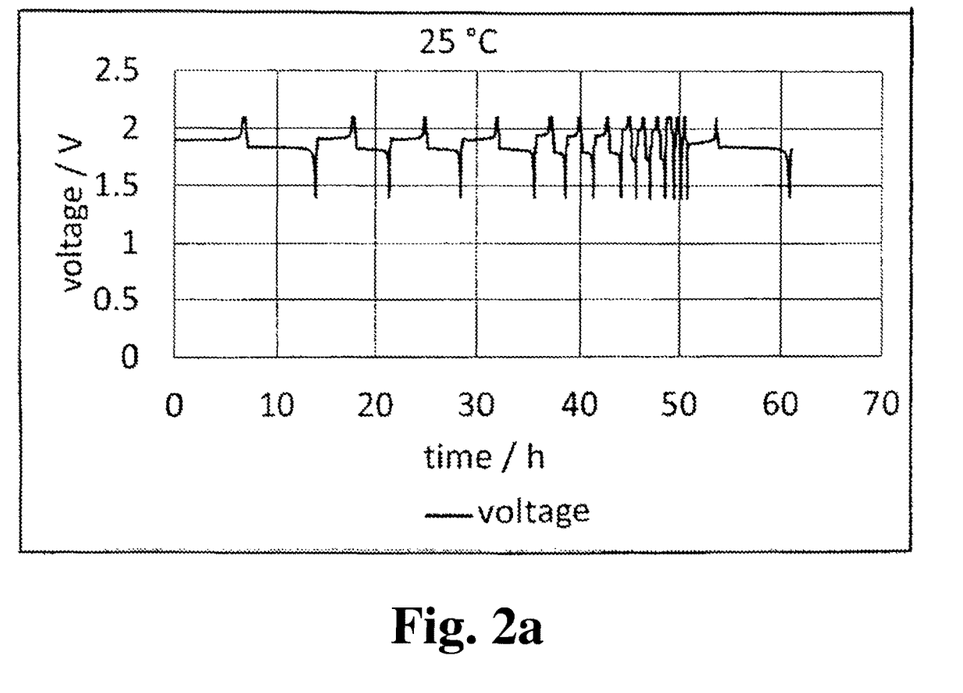
FIGS. 2a to 2d show voltage profiles over time at various temperatures for the battery cell of the present invention.
Figure 2B:
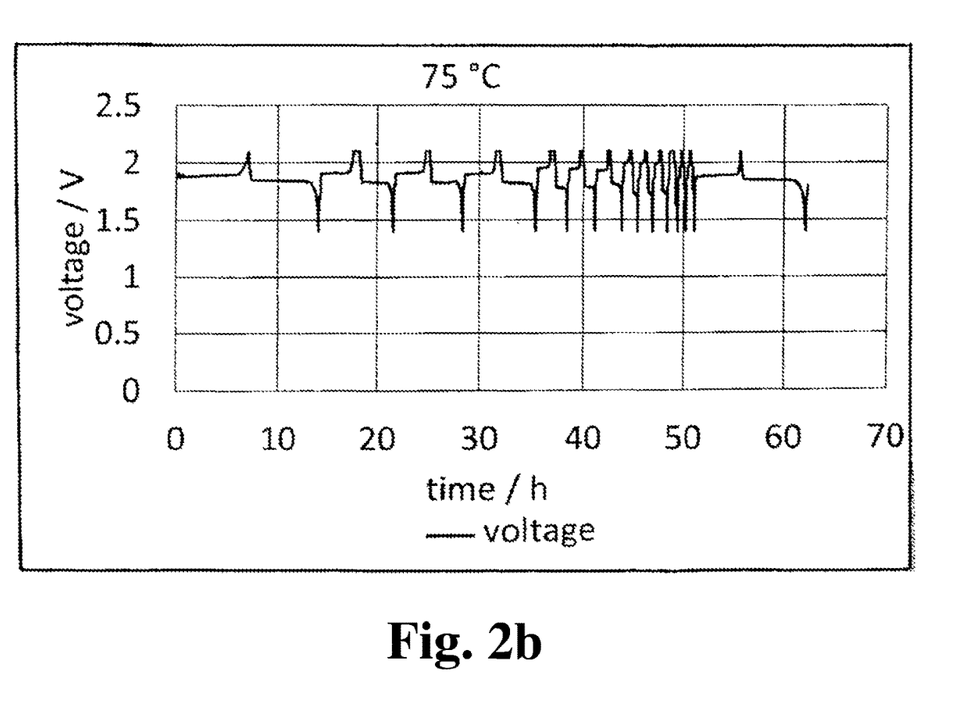
Figure 2C:
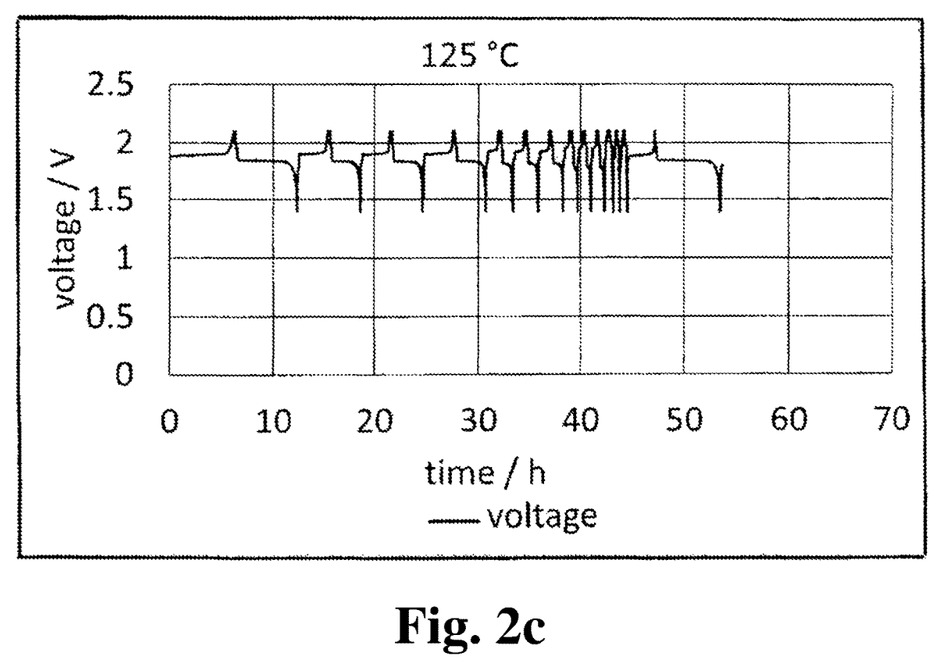
Figure 2D:
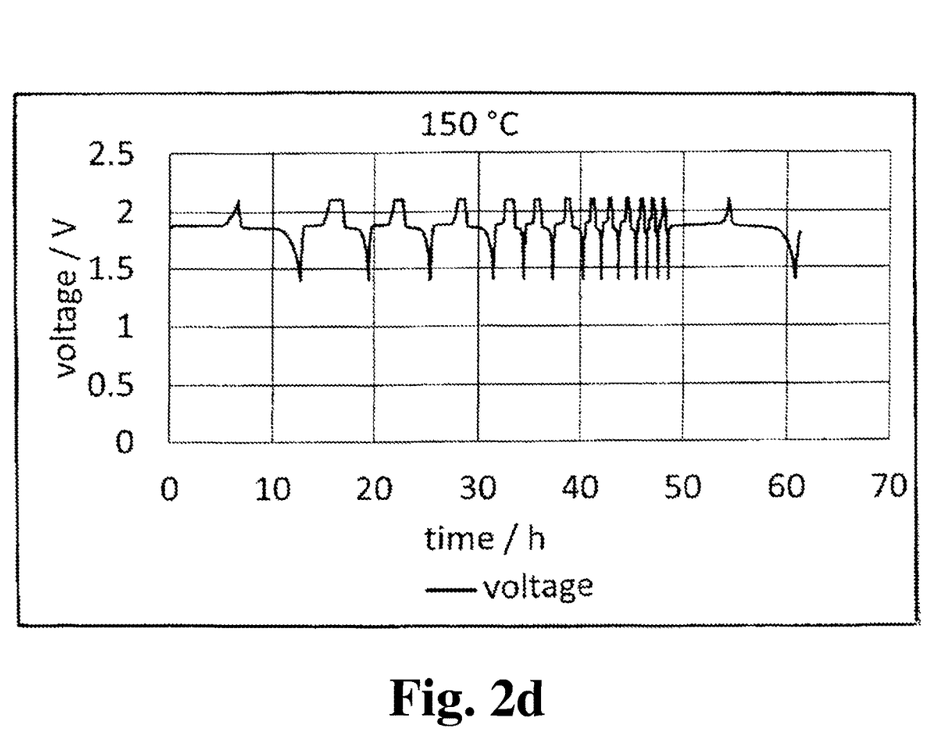

FIG. 1 is a cross-sectional view of a lithium-ion battery 10 consisting of a single battery cell 12 for test purposes. The battery cell 12 comprises a sealed housing 14, a liquid electrolyte 16 within the sealed housing 14, two collector tabs 18, 20 projecting from the sealed housing 14, a composite anode 22 comprising a metal current collector 24 and a dried slurry 26 thereon, the metal current collector 24 being connected to the collector tab 20, a composite cathode 28 comprising a metal current collector 30 and a dried slurry 32 thereon, the metal current collector 30 being connected to the collector tab 18, and a separator blank 34 between the dried slurry 26 of the composite anode 22 and the dried slurry 32 of the composite cathode 28.

The lithium-ion battery cell 12 was produced in a conventional manufacturing process.

The composite anode 22 was prepared in a first step. For the preparation of the composite anode 22, an active material consisting of LTO ($Li_4Ti_5O_{12}$) powder, carbon black powder, an aqueous solution of a binder consisting of a styrene butadiene rubber, and powdered carboxymethylcellulose as a thickener were mixed with distilled water ($H_2O$) in order to produce the slurry. The powdered carboxymethylcellulose was dissolved in water before adding it to the slurry. The slurry was applied onto the metal current collector 24 consisting of a thin aluminum foil having a specific resistance of 0.028 µΩ·m. The slurry on the metal current collector 24 was thereafter dried in an oven in order to finish the composite anode 22.

The composite cathode 28 was prepared in a second step. For the preparation of the composite cathode 28, an active material consisting of LFP ($LiFePO_4$) powder, carbon black powder, an aqueous solution of a binder consisting of a styrene butadiene rubber, and powdered carboxymethylcellulose as a thickener, were mixed with distilled water ($H_2O$) in order to produce the slurry. The powdered carboxymethylcellulose was dissolved in water before adding it to the slurry. The slurry was applied onto the metal current collector 30 consisting of a thin aluminum foil having a specific resistance of 0.028 µΩ·m. The slurry on the metal current collector 30 was thereafter dried in an oven in order to finish the composite cathode 28.

The separator blank 34 was prepared in a third step. The separator blank 34 was cut from a separator material provided by Dreamweaver International, Greenville, South Carolina, U.S.A. The separator material consisted of three fractions of different nonwoven fibrous separator materials, i.e., a cellulose, a polyamide, and a polyethylene terephthalate. The separator blank 34 had a thickness of 25-27 µm and a porosity of 56%.

In a fourth step, the metal current collector 24 of the composite anode 22 and the metal current collector 30 of the composite cathode 28 were connected to the collector tabs 18 and 20, respectively.

In a fifth step, the composite anode 22, the separator blank 34, and the composite cathode 28 were superimposed to each other to prepare a layered assembly with the separator blank 34 between the dried slurry 26 of the composite anode 22 and the dried slurry 26 of the composite cathode 28.

In a sixth step, the liquid electrolyte 16 was prepared by mixing a thermally stable ionic liquid, an organic compound, and a lithium salt.

The ionic liquid consisted of an organic cation and an organic anion. The organic cation was 1-methyl-1-butylpyrrolidinium. The organic anion was bis(trifluoromethanesulfonyl)imide (TFSI). The melting point of the ionic liquid was −6° C.

The organic compound consisted of a low molecular weight polymer, i.e., a polyethylene glycol dimethyl ether, namely, a triethylene glycol dimethyl ether having a melting point of −46° C.

The lithium salt was $LiN(CF_3SO_2)_2$ (LiTFSI).

Even though the melting point of the ionic liquid was only −6° C., the melting point of the resulting liquid electrolyte was below −30° C. It is believed that this is due to the presence of the polyethylene glycol dimethyl ether.

In a seventh step, the layered assembly consisting of the composite anode 22, the separator blank 34, and the composite cathode 28 was introduced into the open hard case sealed housing 14, the collector tabs 18, 20 thereby projecting through the opening. The liquid electrolyte 16 was then filled into the sealed housing 14 until the layered assembly was immersed in the liquid electrolyte 16. The opening of the housing 14 was lastly sealed in order to obtain the lithium-ion battery cell 12 within the sealed housing 14.

The first charging of the obtained lithium-ion battery cell 12 was performed at room temperature. After the first few (3) charge and discharge cycles at room temperature, the battery cell 12 was operated at various temperatures. It was found that charging the battery cell 12 was possible at temperatures as low as −30° C. or less.

The battery cell 12 was then tested in order to measure the charge and discharge capacity and the cycling stability at different temperatures from −30° C. to 150° C.

The charge- and discharge testing of the battery cell 12 was performed at various temperatures, i.e., −30° C., −20° C., −10° C., 0° C., 25° C., 75° C., 125° C. and 150° C. As can be seen from FIGS. 2a to 2d, the voltage profiles of the battery cell 12 at exemplary temperatures of 25° C., 75° C., 125° C. and 150° C. are quite similar.

Figure 3A:
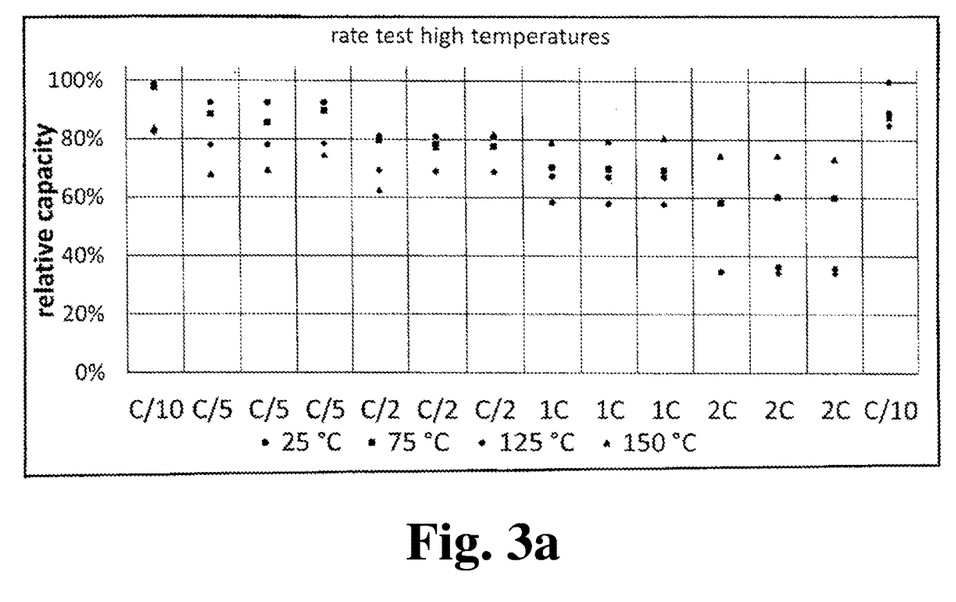
FIGS. 3a and 3b show the results of a rate test for the battery cell of the present invention.
Figure 3B:
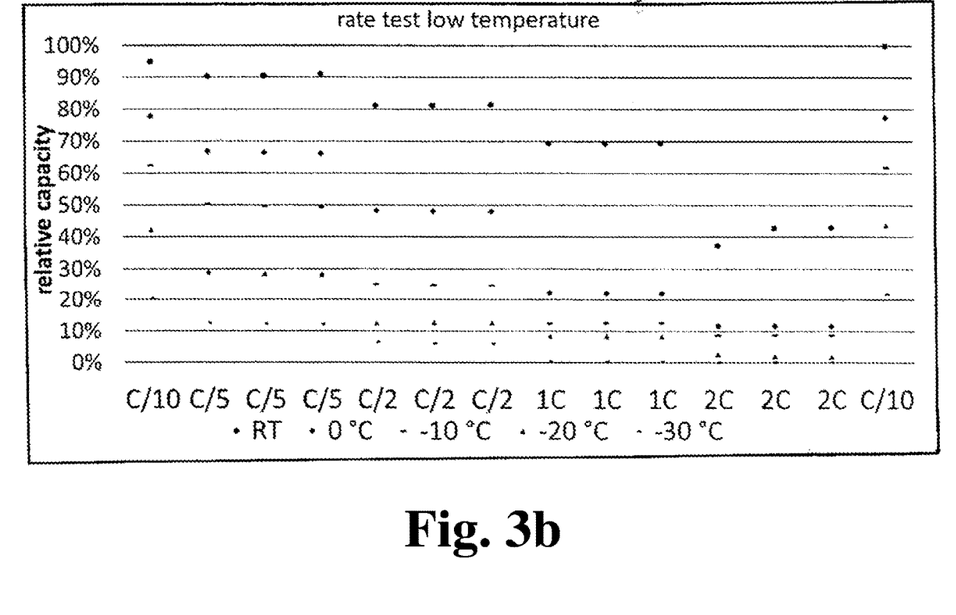
Figure 4:
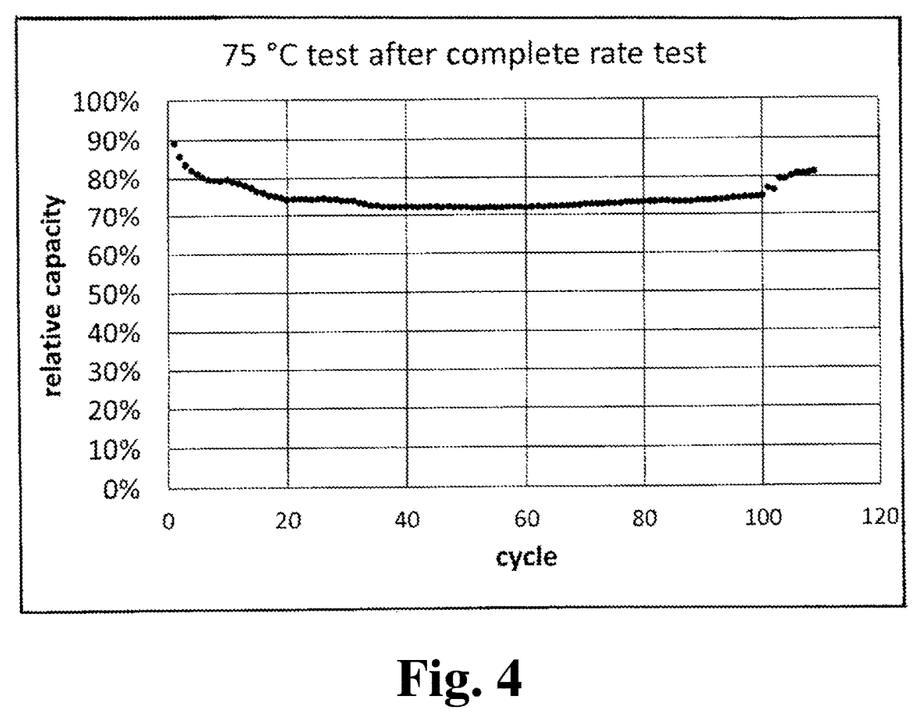
FIG. 4 shows the results of a cycle test (75° C.) after a complete rate test.
Figure 5:
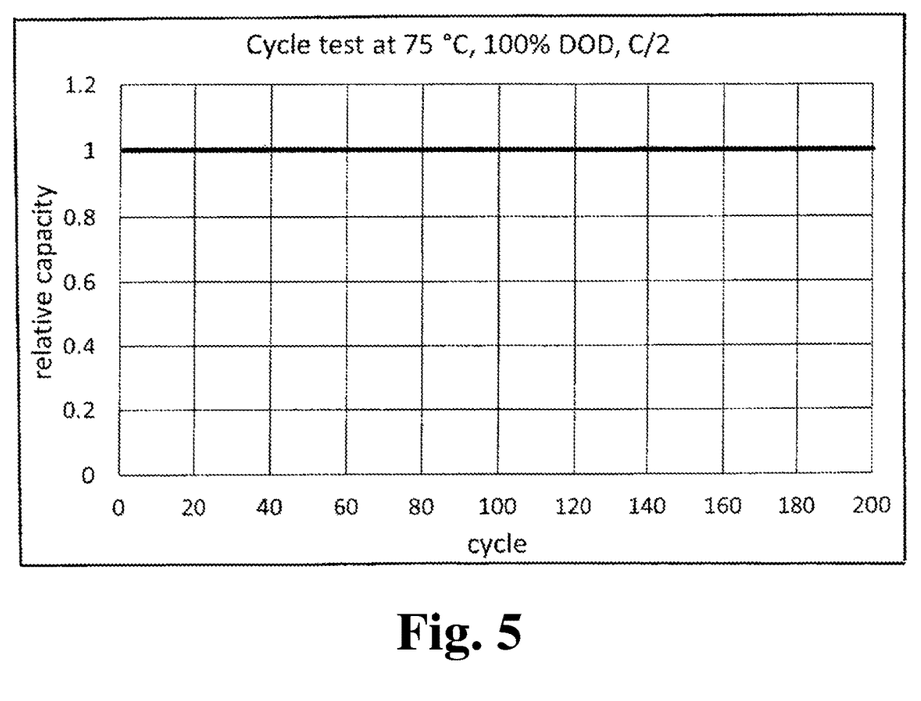
FIG. 5 shows the relative capacity of the battery cell versus the number of cycles at 75° C.

FIGS. 3a and 3b show the results of a rate test for the battery cell 12. The rate test was 1 cycle with a rate of C/10, 3 cycles with a rate of C/5, 3 cycles with a rate of C/2, 3 cycles with a rate of 1C, 3 cycles with a rate of 2C, and one final cycle with a rate of C/10. This procedure of different rates was tested at 25° C., 75° C., 125° C., 150° C. and then again 25° C. The performance with these rates was additionally tested at 25° C., 0° C., −10° C., −20° C., −30° C. to test low temperature performance. FIG. 4 shows the results of a cycle test (75° C.) after a complete rate test for the battery cell 12. FIG. 5 shows the relative capacity of the battery cell 12 versus the number of cycles at 75° C.

Figure 6:
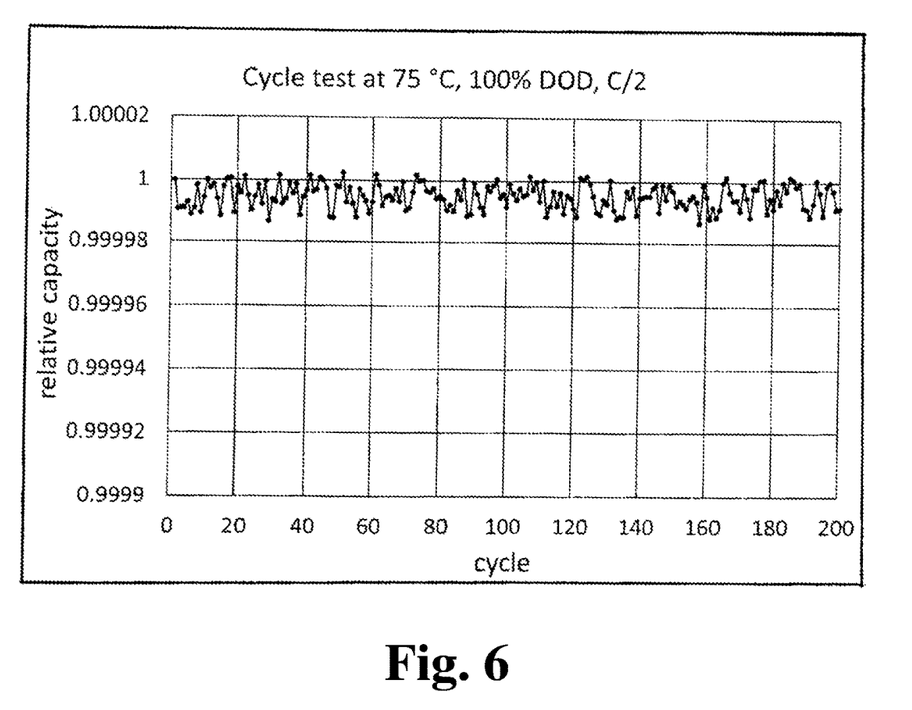
FIG. 6 shows the relative capacity of the battery cell versus the number of cycles at 75° C. at a higher resolution.
Figure 7:
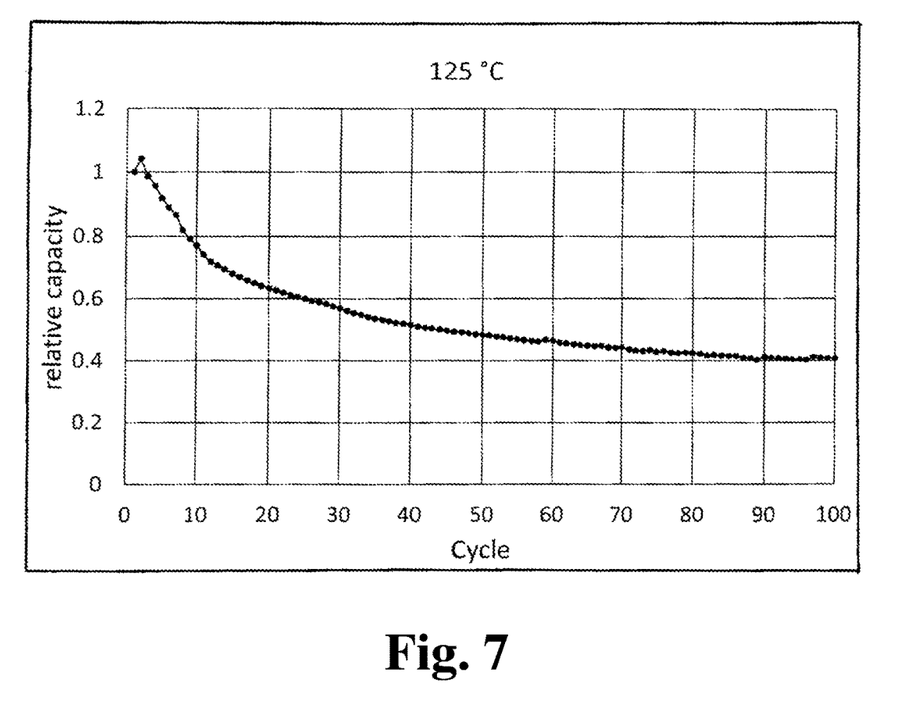
FIG. 7 shows the relative capacity of the battery cell versus the number of cycles at 125° C.

FIG. 6 shows the relative capacity of the battery cell 12 versus the number of cycles at 75° C. at a higher resolution. FIG. 7 shows the relative capacity of the battery cell 12 versus the number of cycles at 125° C.

The battery cell 12 worked for more than 650 hours at temperatures of 75° C. or more without any significant deterioration.

Second Embodiment

The second embodiment of the lithium-ion battery of the present invention was also produced in a conventional manufacturing process.

The second embodiment differed from the first embodiment in that the organic compound of the liquid electrolyte was a diethylene glycol dimethyl ether instead of a triethylene glycol dimethyl ether.

The results were basically the same as described above. The cells with the diethylene glycol dimethyl ether were tested in a temperature range from −30° C. to 125° C.

Third Embodiment

The third embodiment of the lithium-ion battery of the present invention differed from the first embodiment in that the organic compound of the liquid electrolyte was a tetraethylene glycol dimethyl ether instead of a triethylene glycol dimethyl ether The results were basically the same as described above. The cells with the tetraethylene glycol dimethyl ether were tested in a temperature range from −10° C. to 150° C.

All of the embodiments described above could in particular be recharged with high capacity over a wide temperature range and especially at high temperatures.

The present invention is not limited to embodiments described herein; reference should be had to the appended claims.

LIST OF REFERENCE NUMERALS

10 Lithium-ion battery
12 (Lithium-ion) battery cell
14 Sealed housing
16 Liquid electrolyte
18 Collector tab
20 Collector tab
22 Composite anode
24 Metal current collector
26 Dried slurry
28 Composite cathode
30 Metal current collector
32 Dried slurry
34 Separator blank

What is claimed is:

1. A rechargeable lithium-ion battery comprising:
a housing; and
at least one battery cell which is arranged within the housing, the at least one battery cell comprising:
a liquid electrolyte which comprises an ionic liquid, at least one organic compound, and a lithium salt,
a composite anode which comprises a metal current collector which is coated with a layer which comprises at least one active material and at least one binder,
a composite cathode which comprises a metal current collector which is coated with a layer which comprises at least one active material and at least one binder, and
a separator which is arranged between the composite anode and the composite cathode, the separator comprising at least one layer of a nonwoven fibrous separator material which is,
selected from the group consisting of at least one of a cellulose, a polyamide, a polyacrylic acid, a polyaramide, a polyimide, and a polyester, or
is polyethylene terephthalate,
wherein,
the at least one active material of the composite anode is a lithium titan oxide (LTO),
the composite cathode, the composite anode, and the separator, when immersed in the liquid electrolyte, are heat resistant at temperatures of above 150° C., and
the rechargeable lithium-ion battery is rechargeable in a temperature range of from −30° C. to 150° C.

2. The rechargeable lithium-ion battery as recited in claim 1, wherein the metal current collector of the composite anode and the metal current collector of the composite cathode each have a specific resistance of less than 0.04 μΩ·m.

3. The rechargeable lithium-ion battery as recited in claim 1, wherein the metal current collector of the composite anode and the metal current collector of the composite cathode each consist of aluminum or of an aluminum alloy.

4. The rechargeable lithium-ion battery as recited in claim 1, wherein the at least one active material of the composite cathode is selected from the group consisting of LifePO$_4$ (lithium iron phosphate (LFP)), Li(Ni$_x$Mn$_y$Co$_x$)O$_2$ (NMC) (lithium nickel manganese cobalt oxide), LiCoO$_2$ (lithium cobalt oxide), LiMnO (lithium manganese oxide), and LiMnNiO (lithium manganese nickel oxide).

5. The rechargeable lithium-ion battery as recited in claim 1, wherein at least one of the at least one binder of the composite anode and the at least one binder of the composite cathode comprises a styrene butadiene rubber (SBR).

6. The rechargeable lithium-ion battery as recited in claim 1, wherein the separator comprises three different nonwoven fibrous separator materials consisting of a cellulose, a polyamide, and a polyethylene terephthalate.

7. The rechargeable lithium-ion battery as recited in claim 1, wherein the separator has a porosity of >10%.

8. The rechargeable lithium-ion battery as recited in claim 1, wherein the lithium salt comprises LiN(CF$_3$SO$_2$)$_2$ (LiTFSI), LiN(SO$_2$F)$_2$ (LiFSI), LiC$_6$F$_3$N$_4$ (LiTDI), LIN(CF$_3$CF$_2$SO$_2$)$_2$ (LiBETI=BETA), LiCF$_3$SO$_3$ (LiTf), LiClO$_4$, LiBF$_4$, LiNO$_3$, LiAsF$_6$, or LiI.

9. A rechargeable lithium-ion battery comprising:
a housing; and
at least one battery cell which is arranged within the housing, the at least one battery cell comprising:
a liquid electrolyte which comprises an ionic liquid, at least one organic compound, and a lithium salt,
a composite anode which comprises a metal current collector which is coated with a layer which comprises at least one active material and at least one binder, a composite cathode which comprises a metal current collector which is coated with a layer which comprises at least one active material and at least one binder, and a separator which is arranged between the composite anode and the composite cathode, wherein, the at least one active material of the composite anode is a lithium titan oxide (LTO), the composite cathode, the composite anode, and the separator, when immersed in the liquid electrolyte, are heat resistant at temperatures of above 150° C., the rechargeable lithium-ion battery is rechargeable in a temperature range of from −30° C. to 150° C., the at least one organic compound is selected from the group consisting of a low molecular weight polymer, an organic carbonate, a gamma-butyrolactone, a gamma-valerolactone, or a delta-valerolactone, and the low molecular weight polymer comprises:
- an alkylene oxide chain, or
- a low molecular weight polyethylene glycol dimethyl ether.

10. The rechargeable lithium-ion battery as recited in claim 9, wherein the alkylene oxide chain is an ethylene oxide chain or a propylene oxide chain.

11. The rechargeable lithium-ion battery as recited in claim 9, wherein the low molecular weight polyethylene glycol dimethyl ether comprises a diethylene glycol dimethyl ether, a triethylene glycol dimethyl ether, or a tetraethylene glycol dimethyl ether.

12. A rechargeable lithium-ion battery comprising:

a housing; and at least one battery cell which is arranged within the housing, the at least one battery cell comprising:
- a liquid electrolyte which comprises an ionic liquid, at least one organic compound, and a lithium salt,
- a composite anode which comprises a metal current collector which is coated with a layer which comprises at least one active material and at least one binder,
- a composite cathode which comprises a metal current collector which is coated with a layer which comprises at least one active material and at least one binder, and
- a separator which is arranged between the composite anode and the composite cathode, wherein, the at least one active material of the composite anode is a lithium titan oxide (LTO), the composite cathode, the composite anode, and the separator, when immersed in the liquid electrolyte, are heat resistant at temperatures of above 150° C., the rechargeable lithium-ion battery is rechargeable in a temperature range of from −30° C. to 150° C.

the ionic liquid comprises an organic cation and an organic anion, and the organic cation is selected,
- from the group consisting of an imidazolium, piperidinium, pyridinium, pyrrolidinium, and ammonium, or
- from the group consisting of bis(trifluoromethanesulfonyl)imide (TFSI), bis(fluorosulfonyl)imide (FSI), trifluoromethylsulfonate (Tf), 4,5-dicyano-2-(trifluoromethyl)imidazol-1-ide, bis(pentafluoroethanesulfonyl)imide, tetrafluoroborate, and tris(pentafluoroethyl)trifluorophosphate.

13. The rechargeable lithium-ion battery as recited in claim 12, wherein the organic cation is selected from 1-ethyl-3-methylimidazolium, propyl-methyl-imidazolium, propyl-methyl-imidazolium, 1-butyl-2,3-dimethylimidazolium, 1-hexyl-3-methyl-imidazolium, 1-butyl-3-methylimidazolium, 1-dodecyl-3-methylimidazolium, 1-methyl-1-propylpiperidinium, n-hexylpyridinium, trimethyl-butyl-ammonium, triethyl-butyl-ammonium, 1-butyl-1-methylpyrrolidinium, and trihexyl(tetradecyl)phosphonium.

* * * * *